April 22, 1947.   F. B. WILCOX   2,419,474
APPARATUS FOR TAKING PHOTOGRAPHS
Filed Aug. 3, 1942   8 Sheets-Sheet 1

Inventor
Fred Byron Wilcox
By Stevens and Davis
Attorneys

April 22, 1947. F. B. WILCOX 2,419,474
APPARATUS FOR TAKING PHOTOGRAPHS
Filed Aug. 3, 1942 8 Sheets-Sheet 2
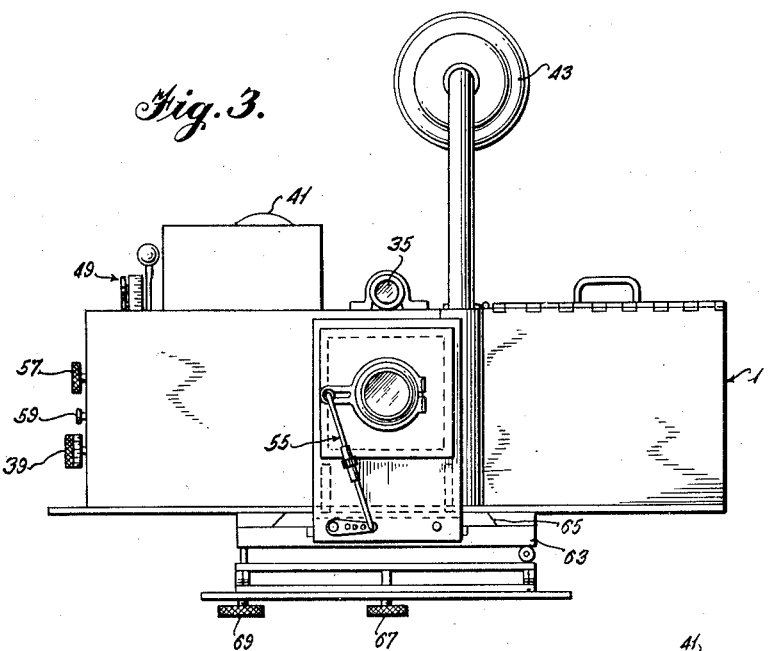
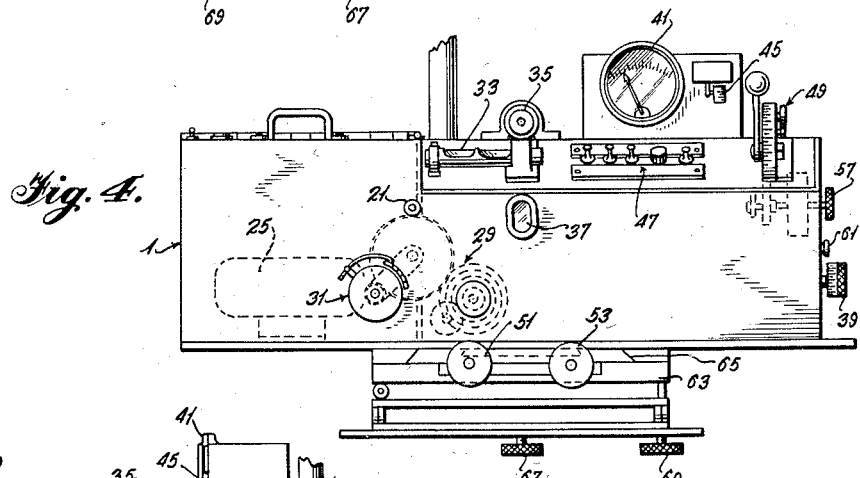
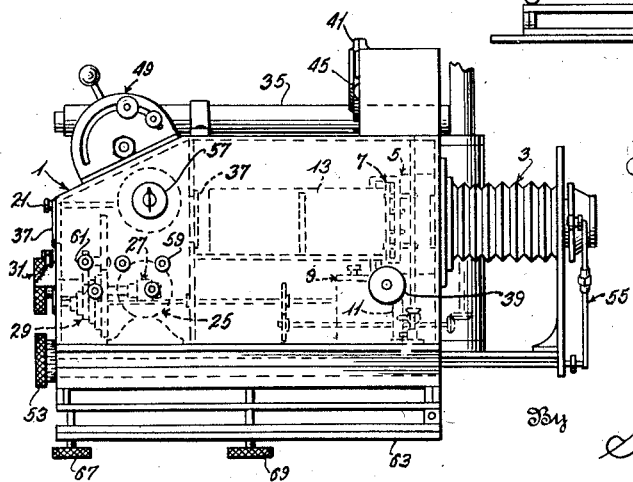
Inventor
*Fred Byron Wilcox*
By *Stevens and Davis*
Attorneys April 22, 1947.  F. B. WILCOX  2,419,474
APPARATUS FOR TAKING PHOTOGRAPHS
Filed Aug. 3, 1942  8 Sheets-Sheet 3

Inventor
Fred Byron Wilcox
By Stevens and Davis
Attorneys

April 22, 1947.  F. B. WILCOX  2,419,474
APPARATUS FOR TAKING PHOTOGRAPHS
Filed Aug. 3, 1942  8 Sheets-Sheet 4
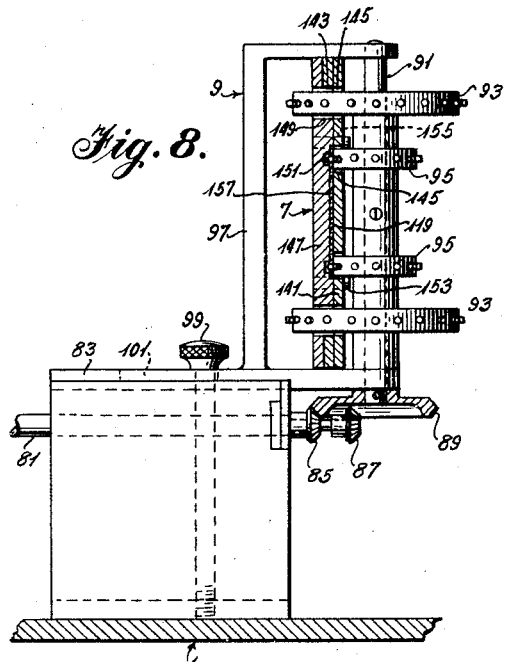
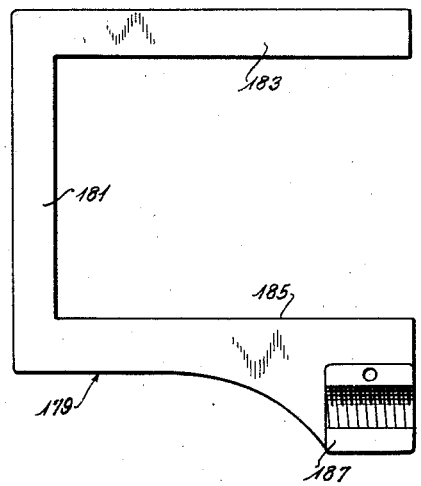
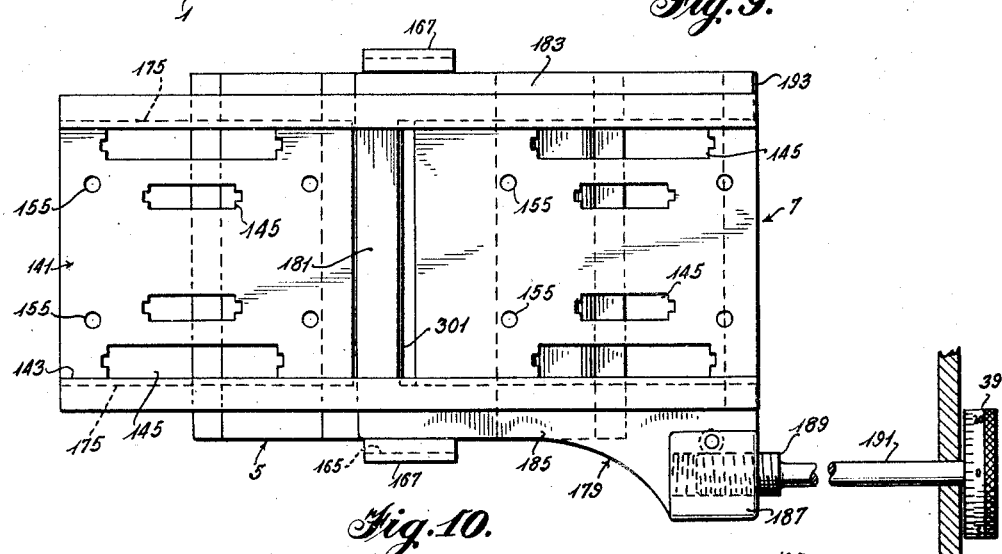
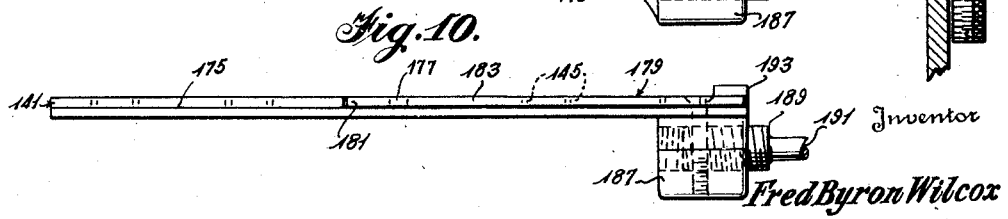
Inventor
Fred Byron Wilcox
By Stevens and Davis
Attorneys

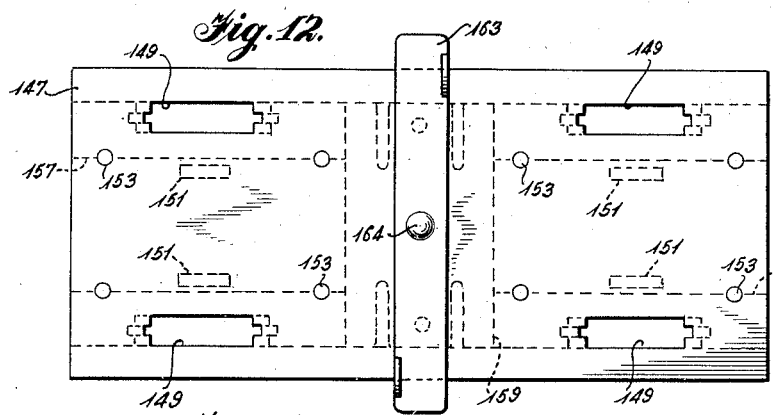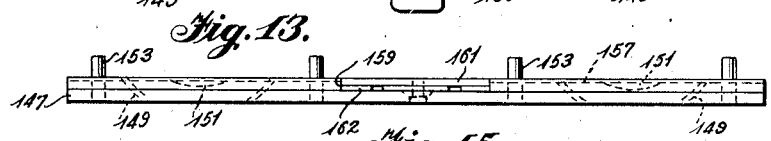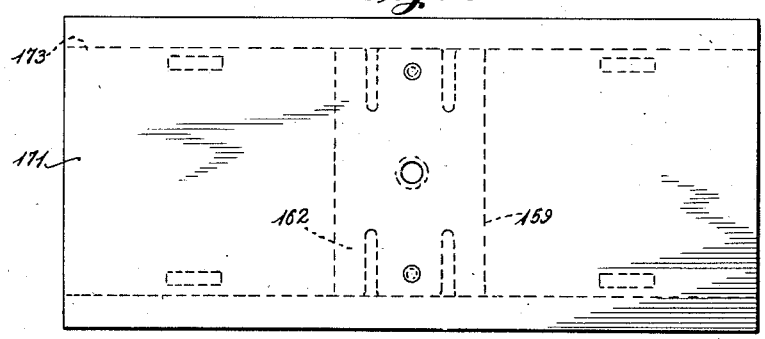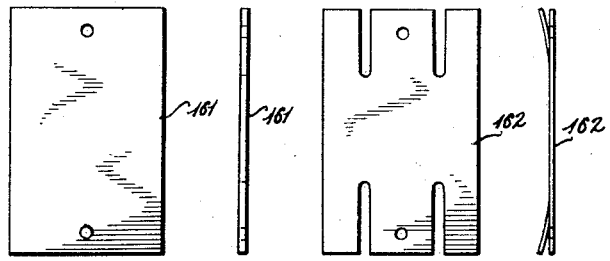

Inventor
Fred Byron Wilcox
By Stevens and Davis
Attorneys

Inventor
Fred Byron Wilcox
By Stevens and Davis
Attorneys

April 22, 1947.　　　　F. B. WILCOX　　　　2,419,474
APPARATUS FOR TAKING PHOTOGRAPHS
Filed Aug. 3, 1942　　　8 Sheets-Sheet 8

Inventor
Fred Byron Wilcox
By Stevens and Davis
Attorneys

Patented Apr. 22, 1947

2,419,474

UNITED STATES PATENT OFFICE 2,419,474

APPARATUS FOR TAKING PHOTOGRAPHS

Fred Byron Wilcox, Olympia, Wash.

Application August 3, 1942, Serial No. 453,432

2 Claims. (Cl. 95—11)

This invention relates to the art of photography and particularly to a camera of the type requiring means to determine the intensity of light falling upon the film strip continuously during its exposure.

More particularly this invention is concerned with the provision of light-resposive means within a camera adapted to expose film of either 16 mm. or 35 mm. width.

It is an object of this invention to provide a camera of the aforesaid type with means for measuring the intensity of the light which is passing to the film at all times whether the light be of great intensity or minute intensity.

A further object of this invention is to provide means whereby all or only a portion of the elements comprising the light responsive means may be employed in making a light measurement as light conditions may require.

A further object of this invention is to provide a camera of the aforesaid type with light responsive means whereby it will be possible to determine the intensity of light falling on either a wide film or a narrow film so that either film size may be used to equal advantage in the same camera.

Other objects and features of my invention will become apparent to those skilled in the art upon reading the following description of preferred apparatus according to the invention, particularly when taken in conjunction with the accompanying drawings in which:

Fig. 3 is a front elevation;

Fig. 4 is a rear elevation;

Fig. 5 is a right side elevation;

Fig. 8 is a side elevation of the film drive sprocket assembly (i. e., the sprocket assembly shown at the left side of Figs. 6 and 7) and with the film guide and cover plate in position;

Fig. 9 shows the film guide, cover plate, and pressure pad assembly including the means for adjusting the width of the exposure slit or aperture;

Fig. 10 is an edgewise view of the assembly shown in Fig. 9;

Fig. 11 is a view showing the adjustable frame which serves to adjust the film exposure slit or aperture to the desired width;

Fig. 12 is a view of the film guide cover plate which may be employed for 16 mm. film;

Fig. 13 is a top view of same;

Fig. 14 is a sectional view showing the assembly of the film guide and cover plate for 16 mm. film;

Fig. 15 shows a film guide cover plate for use with 35 mm. film;

Fig. 16 shows an end view of same;

Fig. 17 is a top view of same;

Fig. 18 is a view showing a small pressure pad or plate which is preferably disposed between the film and the cover plate centrally of the latter and directly back of the exposure slit or aperture to ensure that the film shall be pressed snugly against said aperture during operation of the camera;

Fig. 19 is an end view of same;

Fig. 20 is a view showing a spring which may be disposed between the cover plate and the pressure pad of Fig. 18 to force the latter firmly against the film, and thus in turn forcing the film against the exposure aperture;

Fig. 21 is an end view of the spring;

Figure 1:
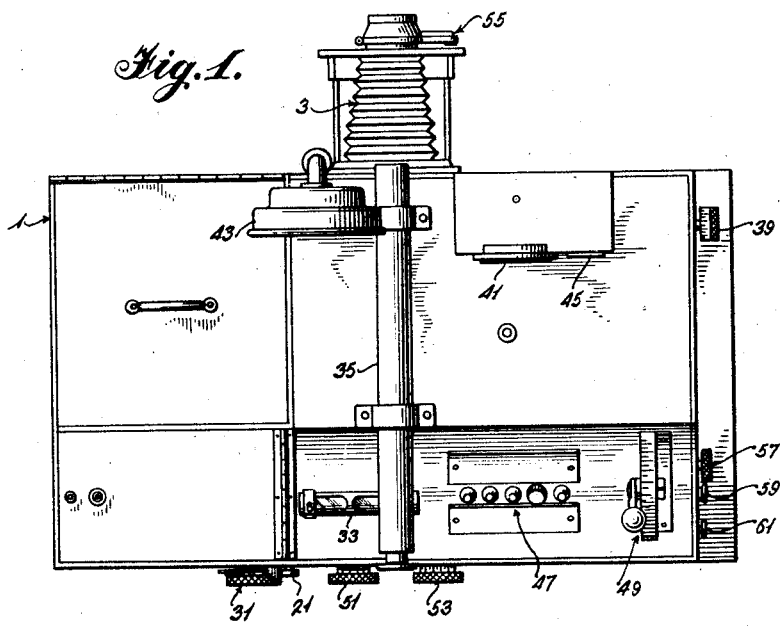
Fig. 1 is a top plan view of the camera.

Referring now more particularly to Figs. 1 to 5, the camera casing is indicated by reference numeral 1. The bellows is indicated by reference numeral 3, and this may be mounted on the conventional slide or rack for adjustment in or out as desired, depending on the focal length of the objective employed.

The light funnel of the camera is shown at 5 (Fig. 2), and the film guide assembly is shown in position at 7. The film drive sprocket assembly is shown at 9, and the driven film sprocket and associated mechanism is shown at 11. The film magazine shown at 13 feeds film 15 through and to film guide assembly 7 and into exposed film-receiving compartment 17. Film cut-off means is shown at 19 with its cutter bar operating means extending outside of the camera case at 21.

Motor compartment 23 contains motor 25 with the associated speed reducer 27 and change-gear mechanism 29. These operate through suitable gearing to be described to drive film 15 in the camera. The change-gear mechanism 29 may be adjusted from without by means of knob 31 to be described later.

The camera includes a level device 33 as well as a telescope 35. The latter is trained in fixed position atop the camera upon the narrow field which is being photographed, such as the race finish line. Cross hairs or fine wires carefully disposed in the telescope serve to assist the operator in the necessary adjustment of the field of the camera.

Holes 37 situated in the optical axis of the camera, and provided with removable covers, may also be provided, thus permitting direct visual adjustment of the focusing or directing of the camera upon the desired field.

Micrometer adjustment knob 39 is provided outside the camera case for the purpose of quickly and accurately adjusting the exposure slit or aperture through which the moving objects are photographed on the film. The knob may be provided with a graduated scale reading in thousandths of an inch or otherwise, if desired.

Light cells situated within the light funnel of the camera, and shown in greater detail elsewhere in the drawings, measure the light passing through the camera from the narrow field being photographed and indicate the measure of intensity thereof on micro-ammeter 41 which, accordingly, functions as a light meter.

Tachometer 43 is provided for giving an indication of the speed of the film drive sprocket, said tachometer being connected to the drive shaft by means of suitable gearing. The tachometer scale may be calibrated in such manner as to give a direct reading of inches per second or feet per minute, or the like, with respect to the actual film speed or travel through the camera.

Film footage meter 45 may be connected through suitable gearing to the driven film sprocket 11 to give an indication of the length of film which has passed through the camera. This footage meter may be an ordinary Veeder Root counter, or otherwise.

Switches 47 are provided for starting and stopping the motor, cutting in and out resistances in the light meter circuit, changing over from D. C. to A. C. current, and for cutting in and out of the light meter circuit different photo-electric cell combinations. These switches may be the ordinary toggle-type switches or otherwise as desired.

The rheostat motor control is denoted by reference 49, this rheostat control being employed to start and stop the motor and control its speed while in motion.

The bellows adjustment knob is shown at 51, this knob being attached to a shaft extending through the camera and, by means of suitable gearing, adapted to cause the bellows to be drawn in and out for adjustment of the camera to the use of lenses of any desired focal length.

Lens stop adjustment is effected by means of knob 53 which is attached to a rotatable shaft extending the length of the camera and, by means of the linkage 55 (Fig. 3), adapted to vary the lens diaphragm opening as desired. Since the lens diaphragm is carried in and out by the bellows upon making the bellows adjustments, this rotatable shaft preferably includes a telescoping arrangement whereby knob 53 remains in constant operative engagement with diaphragm adjusting linkage 55 irrespective of the position of the bellows.

An emergency rheostat control is shown at 57, the purpose of which is to control the operation of the motor in event of failure of the main rheostat control 49. Terminals 59 and 61 are provided as D. C. and A. C. power input connections respectively.

The entire camera is mounted upon a base 63 having a slide with beveled edges 65. The leveling of the camera is obtained by means of the vertical adjustment screws 67 and the vertical adjusting screw 69 (see Figures 3 to 5). The accuracy of the leveling adjustments is determined by means of spirit level 33.

*Sprocket feed and drive mechanism*

Figure 6:
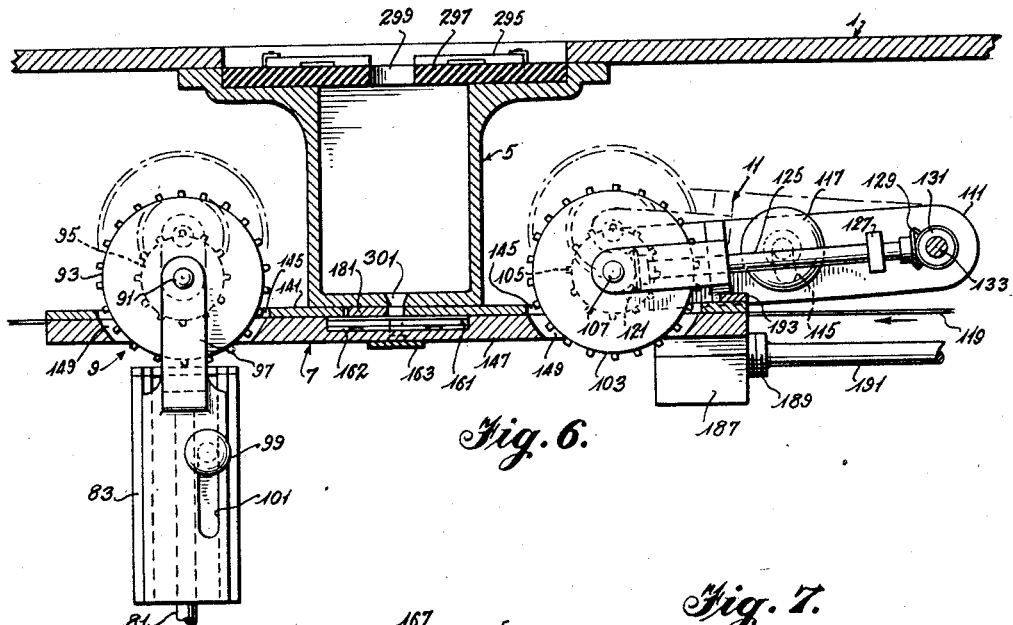
Fig. 6 is a top view, partly in section, of the sprocket film drive mechanism, showing its disposition with relation to the light funnel and the film guide.
Figure 7:
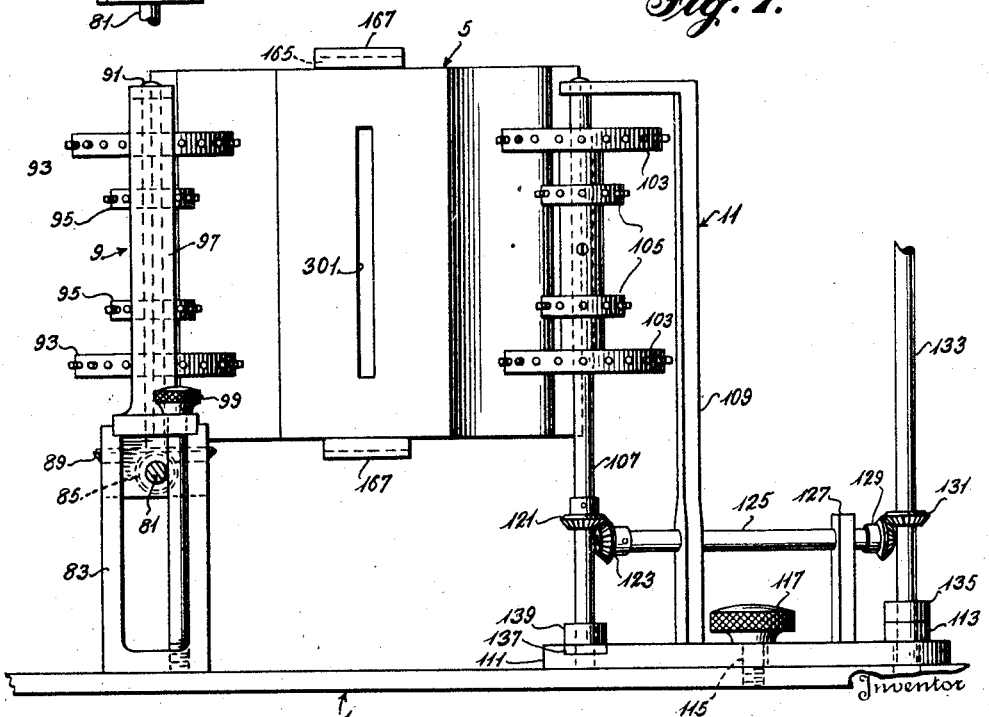
Fig. 7 is a rear elevation of Fig. 6 showing the film sprockets and looking at the back of the light funnel with the film guide and cover plate removed.

Figs. 6, 7 and 8 illustrate one embodiment of sprocket film feed and drive device. According to this embodiment the main drive shaft 81 extends from the motor compartment to the front of bracket 83 (Fig. 8). The drive shaft 81 is a part of the speed change-gear mechanism to be described hereinafter.

Drive shaft 81 carries two bevel gears 85 and 87, each of which is adapted to mesh with bevel gear 89 mounted on vertical sprocket shaft 91. Vertical shaft 91 carries a pair of large sprockets 93 and a pair of small sprockets 95, the teeth of which are adapted to engage 35 mm. and 16 mm. film respectively, the sprockets being attached to and spaced along shaft 91 by any suitable means. Shaft 91, and the sprockets and bevel gear 89 carried thereby, are held in angle bracket 97 which slides in a groove on top of bracket 83. Angle bracket 97 is held securely in desired position by means of thumb screw 99 which extends through slot 101 in bracket 83 to the base plate of the camera. By loosening thumb screw 99, bracket 97 may be raised slightly and slid forward so as to bring bevel gear 89 into meshing engagement with bevel gear 87 on drive shaft 81. This brings the two large sprockets 93 forwardly toward the front of the camera (as shown in dotted lines in Fig. 6) and permits the use of 35 mm. film, since sprockets 93 are thereby brought into such position that the film path through the film guide is substantially tangential thereto.

The film guide assembly 7 is shown in Figs. 6 and 8; Fig. 6 also shows the relative positions of these elements with respect to the light funnel 5 of the camera.

The driven sprocket assembly is shown in Figs. 6 and 7. 35 mm. sprockets 103 and 16 mm. sprockets 105 are mounted on vertical shaft 107 which in turn is carried by angle bracket 109 and slotted member 111. Member 111 pivots on one end about bearing 113, the other end which carries the sprocket shaft being free to slide backward or forward to the extent permitted by intermediate slot 115. When in the back position as shown in full lines in Fig. 6 the 16 mm. sprockets 105 are substantially flush with the film guide 7, with only the sprocket pins extending into the perforations of the film. When member 111 is moved forward into the position shown by dotted lines in Fig. 6, the 35 mm. sprockets 103 are brought substantially flush with the film guide, leaving only the sprocket pins extending into the perforations of the film. In either case the slotted member 111 is held in the desired position by means of thumb screw 117 which passes through the slot 115 and is threaded into the base plate of the camera.

As the film (denoted by 119) is drawn through the camera by the drive assembly, shown at the left side of Figs. 6 and 7 and in Fig. 8, the film perforations engaging the teeth of the sprockets cause sprockets 103 (or 105 if 16 mm. film is employed) mounted on shaft 107 to rotate. Shaft 107 carries a bevel gear 121 which meshes with bevel gear 123 attached to shaft 125, shaft 125 being carried by bracket 109 and bearing 127. This in turn causes rotation of bevel gear 129 carried by shaft 125, which gear meshes with bevel gear 131, carried by shaft 133. Shaft 133 extends through the top of the camera to the footage indicator (denoted by reference numeral 45 in Figs. 1 and 5) and actuates same to indicate the amount of film passing through the camera. Shaft 133 extends into bearing 113 and the thrust thereof is carried by collar 135. Shaft 107 is held in place at the lower end by a bearing 137 and slotted member 111, the thrust being taken up by collar 139.

*Film guide and pressure pad assembly*

Figs. 9 to 21 illustrate embodiments of the film guide, cover plate, and pressure pad.

Referring more particularly to Fig. 9, this view shows the complete film guide assembly in position back of the light funnel 5 of the camera, this view representing in effect a rear elevation of Fig. 6 with the film driving mechanism removed.

The film guide 141 proper is mounted on the back of light funnel 5 as shown in Fig. 6. A rectangular slit 301 in the back of the light funnel 5 permits the light from the lens of the camera to pass through the adjustable slit in the film guide and thus fall upon the unexposed film passing therethrough. Film guide 141 has a shallow channel 143 extending the full length of said film guide and serving as the path for the film to travel therethrough. The width of channel 143 is preferably as little over 35 mm. as is consistent with its function of closely confining the film while at the same time avoiding any binding action thereon.

Through the bottom of the channel portion 143 of film guide 141 are cut a series of clearance holes 145 in the manner shown in Fig. 9 to provide clearance slots for the film sprockets to rotate, the flat parts of the sprockets when in operating position being flush with the film guide and the sprocket pins or teeth extending from above into the perforations of the film.

With the film guide 141 there is employed a cover plate which fits over the channel 143 to completely confine the film in the film guide in a light-tight manner.

When 16 mm. film is employed in the camera this cover plate may take the form shown in Figs. 12, 13 and 14, and when 35 mm. film is employed the cover plate may take the form shown in Figs. 15, 16 and 17; both cover plates being interchangeable at will.

Fig. 12 shows the 16 mm. cover plate with clamping bar, Fig. 13 is a top plan view thereof, and Fig. 14 is a side view showing the film guide and cover plate in assembled position. The 16 mm. cover plate of Fig. 12 consists of plate 147 in which there is milled a series of large clearance holes 149 for the 35 mm. sprockets, so that these may extend through the cover plate when the small sprockets are brought into operating position flush with the guide plate. Plate 147 also contains clearance holes 151 which allow for the driving pins or teeth of the small film sprockets.

The 16 mm. film is guided or supported across the film guide by a series of eight pins 153 which fit into corresponding holes 155 in the film guide 141. Pins 153 are press-fitted into cover plate 147 but have sliding fit with respect to holes 155 in film guide 141. A channel or recess 157 is milled to a slight depth into the film contacting surface of cover plate 147. This channel 157 extends the full length of cover plate 147 and is of a width just slightly over 16 mm. so that the film will be closely confined thereby, but not so closely as to bind the film. Pins 153 are so disposed that their centers intersect the edges of channel 157 and the pins are therefore milled in half. In other words, pins 153 from the bottom of the channel 157 to the ends of the pins are semi-cylindrical in shape and thus help to support and guide the film during its travel through the film guide assembly.

Cover plate 147 has a vertical slot 159 milled across the center thereof in a direction at right angles to film channel 157. This slot is for the purpose of accommodating pressure pad 161 (shown in Figs. 18 and 19) which is disposed therein. Between pressure pad 161 and cover plate 147, there is disposed spring or clip 162 which tends to urge the pressure pad outwardly, i. e., toward the film passing between the cover plate and the film guide. In this manner it is insured that the film will be held tightly against the adjustable slit or aperture in the light funnel of the camera, which in turn results in a sharp picture free from fog.

Means for holding the cover plate on the film guide is shown at 163, this being a bar of spring metal pivotally secured to the center of the cover plate 147 by means of screw 164. The ends of bar 163 fit into slots 165 of clamps 167 which in turn are fastened to the light funnel of the camera thus securely but detachably holding the entire assembly in place against the light funnel.

When 35 mm. film is used, cover plate 171 shown in Figs. 15 to 17 may be employed. This cover plate is in general similar to cover plate 147 and hence need not further be described except to note that it is not necessary that it be provided with pins 153 for guiding the film. Instead cover plate 171 is milled longitudinally along its edges to provide a thickened central portion, as shown at 173 in Fig. 16, the width of this portion being substantially 35 mm. whereby said central portion fits snugly into channel 143 of the film guide plate 141 shown in Fig. 9. As in the 16 mm. assembly, cover plate 171 may be provided with central slot 159 into which fits pressure pad 161 urged outwardly by spring 162 to insure that the film will be pressed tightly against the slit or aperture.

Returning to a description of the adjustable slit or aperture, the film guide 141 carries two grooves cut the full length thereof and indicated by reference numerals 175 in Fig. 14. In the center of this film guide 141 a vertical slot 177 (Figure 10) is milled across the back and extending into the film track. In this slot 177 and grooves 175 slides the adjustable frame 179 (Fig. 11), which frame comprises a U-shaped element, the base portion 181 of which masks the aperture 301 in the light funnel of the camera and the legs 183 and 185 of which slide in grooves 175. The width of the base portion 181 is somewhat less than that of slot 177 so that by suitable adjustment of the frame 179 with respect to film guide 141, the width of the effective vertical slit through which light from the camera objective passes to the film may be varied as desired. The adjustment of frame 179 is obtained by providing the lower leg 185 with a split nut 187 into which fits the micrometer screw 189. The shaft 191 of this screw extends through the side wall of the camera to the knurled knob 39 (see also Figs. 1 to 5) carrying a dial which may be graduated in thousandths of an inch. This allows the camera operator to quickly and accurately adjust the exposure slit or aperture from without the camera. The side members 183—185 of adjustable frame 179 are held in place on the film guide by the spring member 193.

*Speed change gear assembly*

Figure 2:
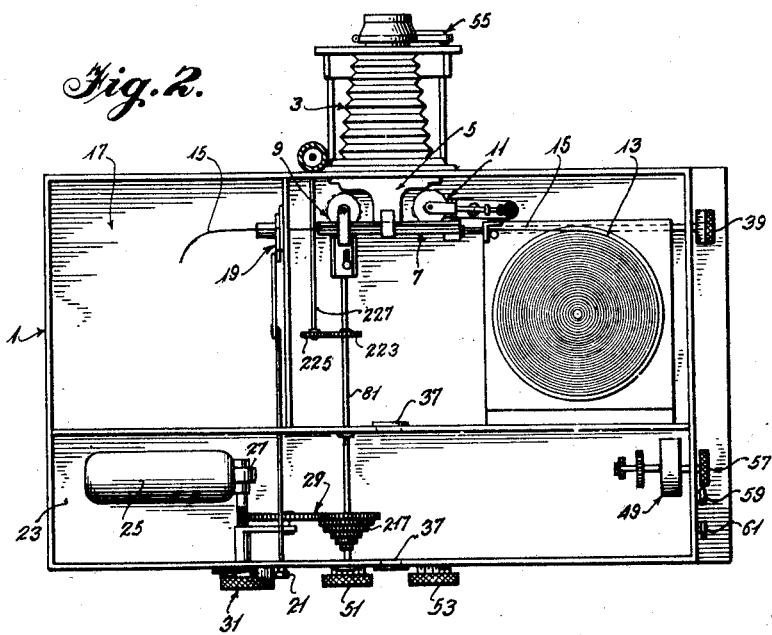
Fig. 2 is a top plan view with the cover removed, showing certain parts of the mechanism within the device.
Figure 22:
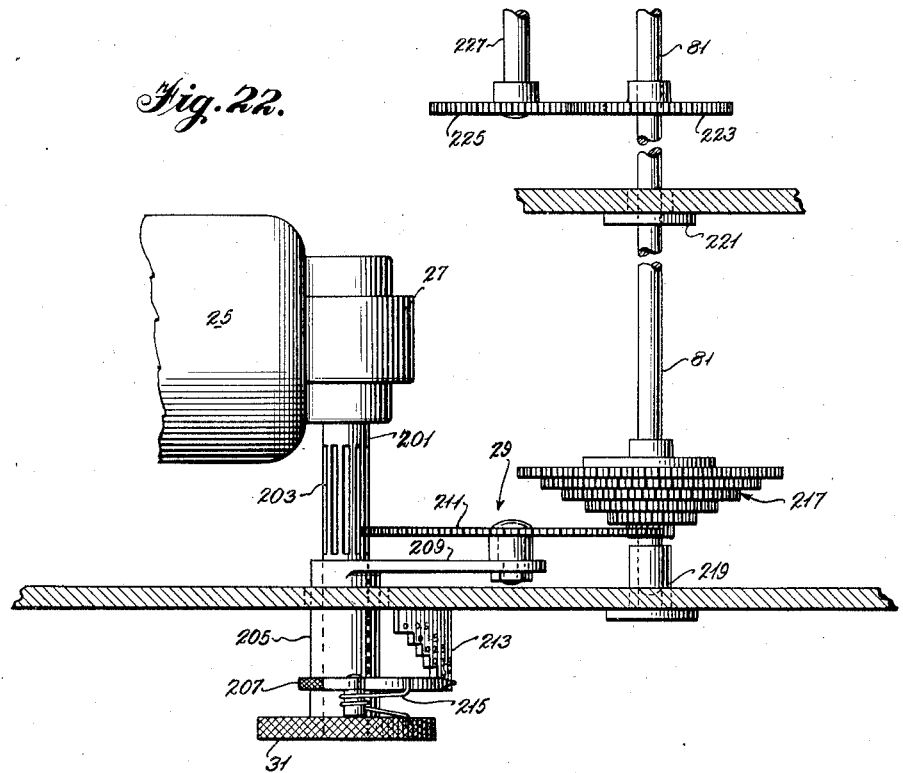
Fig. 22 is a top view, partly in section, showing the motor and speed reducer and one form of change-gear assembly.
Figure 23:
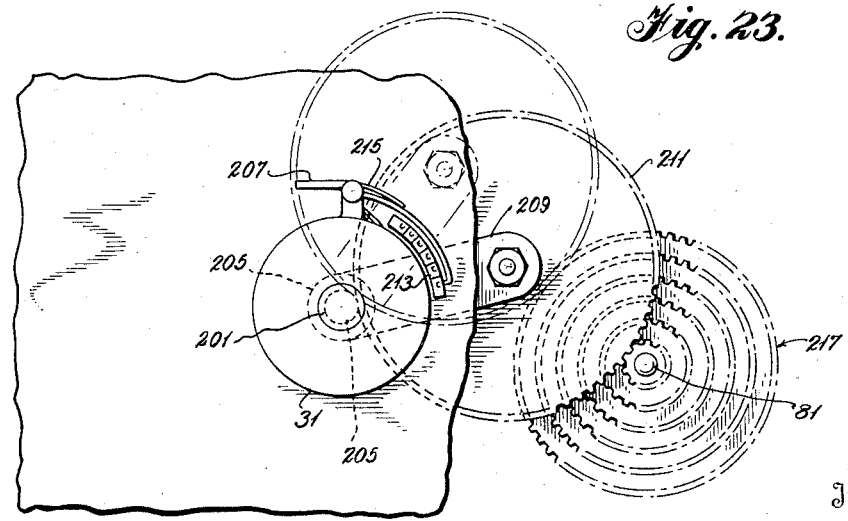
Fig. 23 is a view showing details of the speed change-gear mechanism of Fig. 22.

This assembly is shown in Figs. 22 and 23 and comprises the motor 25 which may be equipped with built-in speed reducer 27. Shaft 201 from the speed reducer has gear teeth milled axially along the circumference thereof to form a gear 203. Shaft 201 extends beyond this gear through the back of the camera, as shown in Fig. 2, and into a sliding bearing 205 carrying a knurled knob 31 and ratchet latch 207 on one end and an arm 209 extending at right angles from shaft 201 at the other end. Sliding bearing 205 is fitted into the wall of the camera in such manner that it can be rotated as well as moved in and out along shaft 201. Arm 209 carries an idler gear 211 which is always in mesh with gear 203 on speed reducer shaft 201 over which this assembly slides. On the outside of the camera there is provided a cylindrical plate 213 with stepped notches and holes to receive latch mechanism 207. Plate 213 carries numerals showing, for example, inches per second as an indication of the film speed. By holding knob 31 and pressing latch 207, the idler gear assembly may be turned and slid backward or forward on speed reducer shaft 201 to mesh with any one of gears 211 and thereby secure whatever gear ratio may be desired. When latch 207 is released spring 215 securely locks it in plate 213, thereby holding idler gear 211 in mesh with the selected gear of the driven gear assembly 217 fixed on main drive shaft 81.

The main drive shaft extends from bearing 219 through the film compartment bearing 221 in the film compartment wall to the sprocket drive mechanism shown in Figs. 6 to 8.

Shaft 81 also carries a gear 223 which meshes with and drives gear 225 on shaft 227. Shaft 227 extends through the front wall of the camera, as shown more particularly in Fig. 2, to a bevel gear box (not shown), and then to tachometer 43 (Fig. 1) which provides an indication of the film speed in inches per second, or in any other units for which the tachometer may be calibrated.

Fig. 23 is a detail of the gear assembly of Fig. 22, showing how idler gear 211 may be swung about in various positions so as to cause speed reducer shaft 201 to drive the main drive shaft 81 by means of any of the various sized gears of gear assembly 211, thus providing a number of different gear ratios.

*Rheostat motor control*

Figure 24:
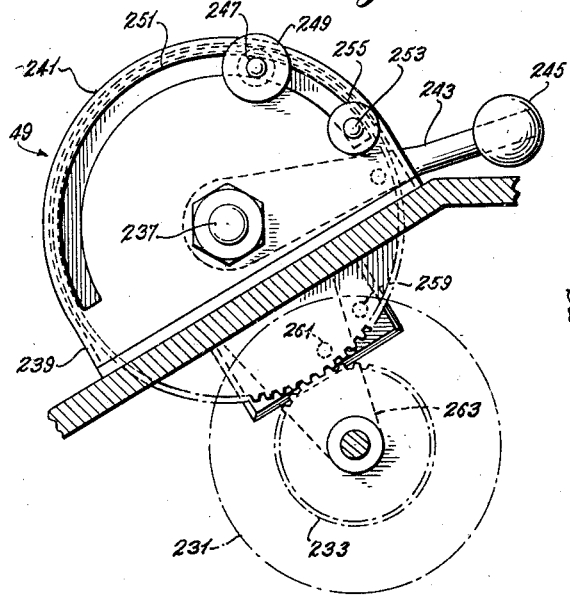
Fig. 24 is a view showing the rheostat motor control.
Figure 25:
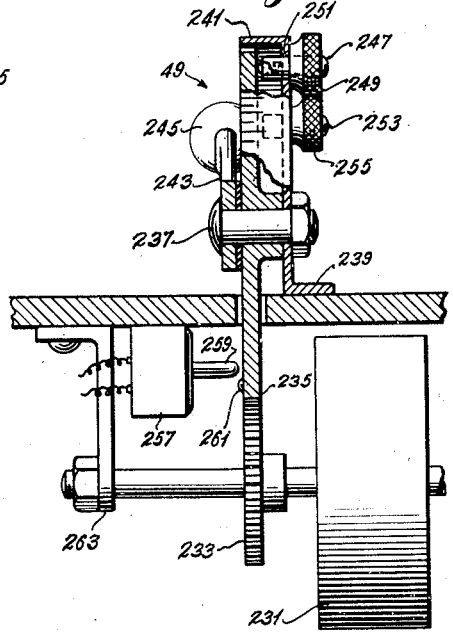
Fig. 25 is a sectional view showing details of Fig. 24.

The rheostat motor control as shown in Figs. 24 and 25 is mounted upon a rear sloping wall of the camera. This rheostat is also shown on Figs. 1 and 3 to 5, particularly Fig. 5.

The rheostat control assembly includes the rheostat 231 having a small gear 233 replacing the usual knob. Gear 233 meshes with gear 235 mounted on pin 237. Pin 237 passes through gear 235 and is held in frame or bracket 239, the latter being attached to the outside of the camera on the control panel thereof. Frame 239 has a graduated edge or cylindrical portion 241 which partially encloses the gear 235. Pin 237 also carries a lever 243 which is securely attached to gear 235 so as to be movable therewith. Lever 243 has a ball 245 on the outer end thereof to facilitate manipulation of the control device. An adjustable stop 247 of the bullet type, i. e., including a ball bearing and spring assembly, bears against gear 235, more particularly against a small hole or depression drilled in said gear 235. By loosening thumb nut 249 this stop may be positioned at any desired position along the circumferential slot 251 in frame 239.

A fixed stop 253 of the bullet type, and provided with thumb nut 255, also bears against gear 235.

Mounted beneath the control panel is a micro switch 257 which carries a contact pin 259 which engages with pin 261 on gear 235. Bearing member 263 attached to the under side of the control panel, with another bearing member (not shown), provides a support for the rheostat.

According to the operation of this rheostat control assembly, when lever 243 is advanced to its forward position, i. e., to the right as shown in Fig. 24, the motor circuit is open and the control room being dark, the exposed film may be cut off by means about to be described, and developed in any desired manner. When lever 243 is pulled back so that the fixed stop 253 catches in the hole in the side of the gear 235, the pin 261 on the opposite side of the gear 235 makes contact with pin 259 of microswitch 257 thereby turning on the panel lights, but not operating the motor. When the lever 243 is brought back past this catch the rheostat turns the power on full and the motor may then be slowed down by pulling lever 243 back still further. When the desired motor speed is obtained the adjustable stop 247 may be slid back in slot 251 to engage the corresponding hole in gear 235 and there locked in position by means of thumb nut 249 so that this position may be found again in the dark if necessary.

*Film cutter*

Figure 26:
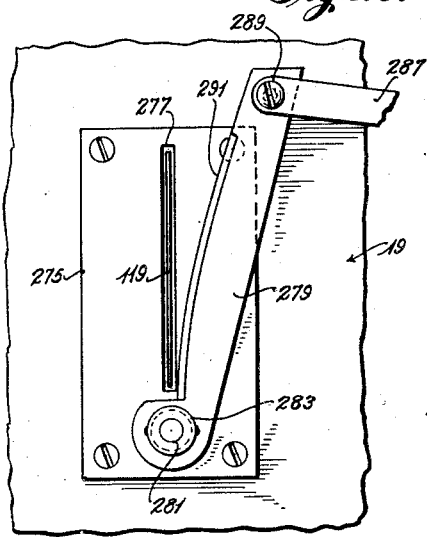
Fig. 26 is a view showing the film cutter device.
Figure 27:
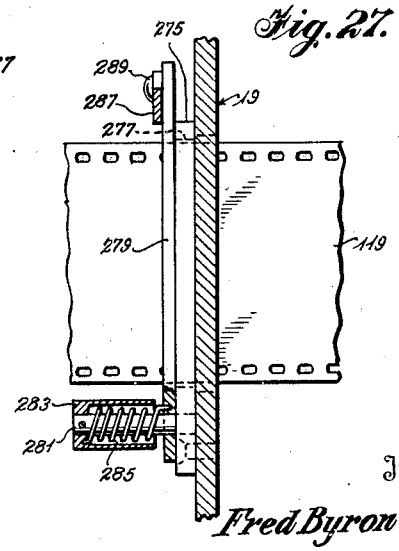
Fig. 27 is a view, partly in section, taken at right angles to Fig. 26 and showing the film cutter bar about to cut a strip of film.

The film cutter mechanism is shown more particularly in Figs. 26 and 27, its assembled position in the camera being indicated by reference numeral 19 in Fig. 2.

The film cutter includes a hardened steel plate 275 attached to the wall separating the exposed-film receiving compartment from the compartment containing the sprocket drive, light funnel of the camera, etc. The plate 275 has a vertical slot 277, the dimensions of which are just sufficient to permit the film 119 to clear same, slot 277 being aligned with the film channel of the film guide.

A hardened steel knife blade 279 is pivotally attached to plate 275 in such manner that it rotates in a plane vertical to the plane of film travel. This is accomplished by providing a pin 281 just below slot 277 and in the same plane, about which knife blade 279 is adapted to pivot. Knife blade 279 is held in place on pin 281 by means of cap 283 in which is disposed a coiled tension spring 285 which returns the knife into non-cutting position shown in Fig. 26 after actuation thereof. Knife blade 279 is actuated by a toggle link 287 attached to the upper end thereof by means of pin 289. The other end of toggle link 287 is connected to an actuating rod which in turn is connected to knob 21 (Fig. 2) disposed outside the camera case. The knife blade 279 has a curved cutting edge 291 whereby, upon actuation of knob 21 from without the camera, cutting edge 291 sweeps across the film toward the left as shown in Fig. 26, cutting it off at the desired point.

*Photoelectric cell mounting*

Figure 28:
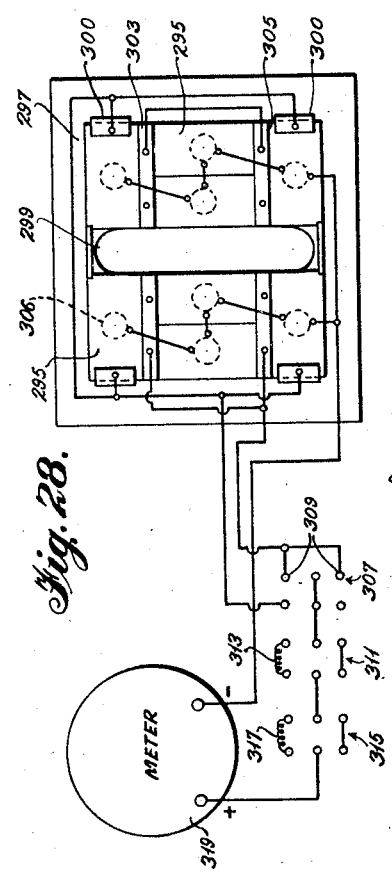
Fig. 28 is a view showing the photo-electric cell mounting including the wiring diagram.

This is shown in Fig. 28. As there indicated, eight photoelectric cells 295 are mounted within the light funnel of the camera. The relative positions of these photoelectric cells are also indicated in Fig. 6.

The photoelectric cell mounting 297 contains an elongated slot or orifice 299 through which light from the lens of the camera passes to the exposure slit or aperture 301, said last named slit or aperture 301 lying immediately in front of the film passing through the camera.

Figure 28A:
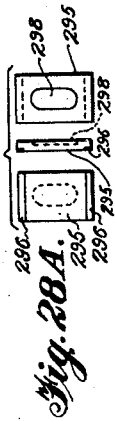
Fig. 28A shows the details of the photo-electric cell.

Each photoelectric cell has two metal strips 296, one at each end of the front side thereof. Strips 296 are the positive terminals of the photoelectric cell. A metal strip 298 centered on the back of each photoelectric cell constitutes the negative terminal (see Fig. 28A).

The photoelectric cell mounting 297 carries two strips 303 and 305 which contact the positive terminals 296 of the four central cells 295, these being connected in parallel to one terminal of switch 307. Mounting 297 also carries four contact strips 300 which contact the positive terminals 296 of the four outer photoelectric cells 295, these strips being connected in parallel to another of the terminals of switch 307.

Round discs 306 are brass plates set in mounting 297 which make contact with the back 298 of each individual light cell. These plates are connected by a wire leading directly to the light meter. The eight cells are connected together in series-parallel in such a manner that they may be thrown into the light meter circuit in groups of four, depending upon the intensity of the light entering the camera.

The positive terminals of the four center photo cells are connected (by means of strips 303 and 305) in parallel and lead out to switch 307, which may be an ordinary toggle switch of the double pole-double throw type. This lead connects to each of the outside terminals 309 of switch 307. The two center terminals of the switch 307 are connected together and lead to one center terminal of switch 311, which may be a toggle switch similar to switch 307. Two end terminals of toggle switch 311 are shorted, while the other two end terminals have a resistor 313 connected thereacross. The other side center terminal of switch 311 leads to a center terminal on switch 315, which switch may be a duplicate of switch 311. As in the case of switch 311, two end terminals of switch 315 may be shorted while the other two end terminals have a resistor 317 connected therebetween. The other center terminal of switch 315 leads directly to light meter 319, which may be a micro-ammeter designed to detect extremely small currents flowing in the circuit.

The operation of the photoelectric circuit is as follows: When all the toggle switches are thrown down (i. e., down as shown in Fig. 28) the light meter is connected only to the four center photoelectric cells 295 on mounting 297, this being the preferred arrangement when 16 mm. film is used. When switch 307 is thrown upwardly the remaining four photoelectric cells are thrown into the circuit for use when 35 mm., or larger, film is employed in the camera.

Should the light passing through the camera become too intense, such as when the day is extremely bright or when the field of the camera is larger than desired, so that the pointer of the light meter runs off the scale, toggle switch 311 may be thrown upwardly to put resistor 313 in circuit, whereupon the pointer of the meter will be brought back to the desired position intermediate of the scale. Should resistor 313 prove insufficient to bring the light meter pointer back on to the scale, toggle switch 315 may then be thrown upwardly to bring resistor 317 into the circuit also and thus bring back the light meter needle to desired position.

It will be observed that once the camera has been placed in operating position and the proper light meter reading for a given diaphragm opening determined, any substantial variation thereafter in the intensity of the light incident on the photoelectric elements (such as for instance may be caused by local conditions such as clouds or variations in the light with the time of day) produces a corresponding change in the light meter reading. This change may be employed by the camera operator as an indication of the extent to which the diaphragm opening of the camera should be changed by the adjustment of knob 53 and linkage 55 (see Figures 1 and 3). In the same manner, and particularly in conjunction with the adjustment of the exposure slit or aperture by means of knob 39 (Figures 1 to 5), the camera may be readily and quickly adjusted to take care of any and all variations in light conditions of the field being photographed, so that proper photographing of the objects will be attained.

*Rheostat motor control*

Figure 29:
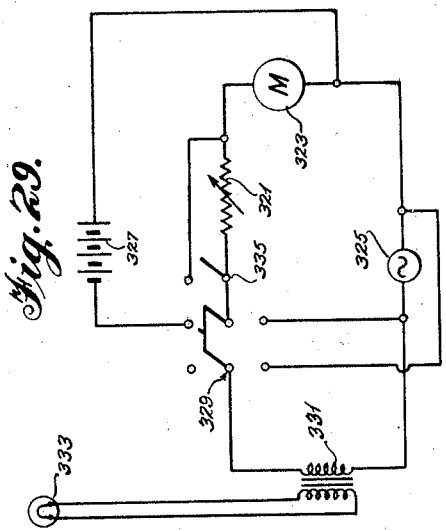
Fig. 29 is a wiring diagram of the rheostat control of Fig. 24.

The rheostat motor control circuit is shown schematically in Figure 29. In this figure adjustable rheostat 321 (corresponding to 231 of Figure 24) is connected in series with motor 323 which is preferably a universal motor, adapted to operate on either A. C. or D. C. current. A. C. current source is indicated at 325 and D. C. current source is indicated at 327. When switch 329, which may be a double-pole double-throw switch, is thrown downwardly to place the A. C. current source 325 in circuit with motor 323, rheostat 321 may be employed to control the speed of the motor. The primary of transformer 331 is also connected to A. C. current when switch 329 is thrown down, the secondary of the transformer being connected directly to the panel light system. When switch 329 is thrown upwardly, the motor 323 and rheostat 321 are placed in circuit with direct current source 327 so that by suitable adjustment of rheostat 321 the motor may be caused to operate at any desired speed. A single-pole single-throw switch 335 is placed across the leads of rheostat 321 for use in case the rheostat element burns out or otherwise fails.

*Photo-time-chart*

Figure 30:
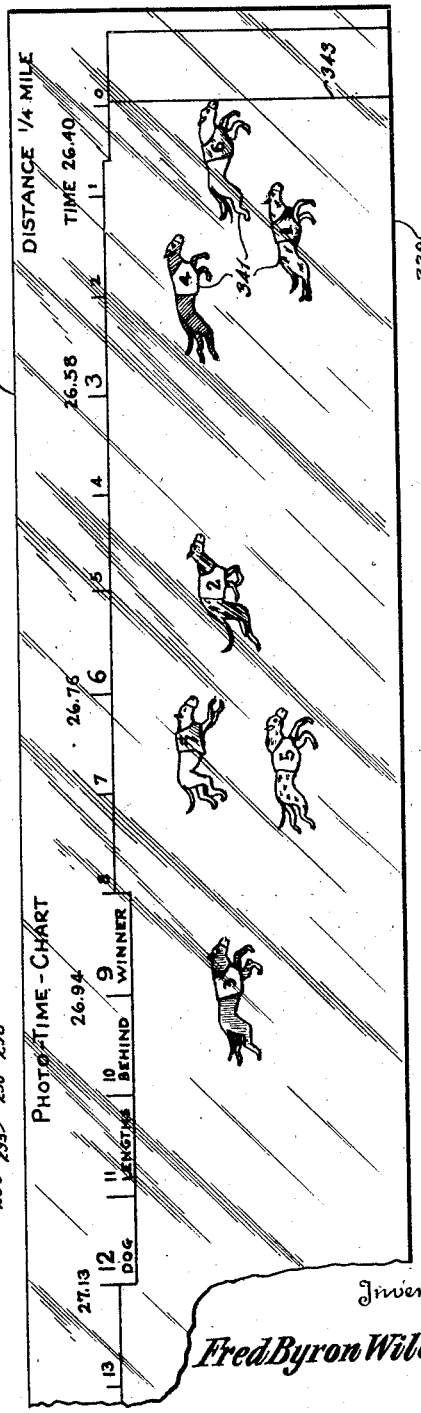
Fig. 30 is a view showing a photographic record obtained by the present invention, wherein the contestants of a race are depicted as spread out along the length of the record in a manner which is directly related to the sequence in which they crossed the fixed reference line, i. e., the finish line.

The record obtainable by the apparatus of the present invention is shown in Figure 30. A strip of film 339 is obtained upon which the race contestants (shown for the purpose of illustration as dogs 341) are spread out according to the sequence in which they actually crossed the finish line 343.

It is to be particularly noted that since the camera is trained only upon a narrow portion of the race track at the finish line the strip or chart 339 does not portray the contestants as they actually appear on the track at any one instant but, rather, the strip portrays them only as they cross the finish line. In other words, by drawing a line 343 across the strip of film intersecting the nose of the lead dog 341 the distance between the remaining dogs and the lead dog, as measured along the strip, gives an extremely accurate indication of the elapsed time passing between the time the first dog crossed the finish line and the respective times when the remaining dogs crossed the finish line. Consequently, from the knowledge of the actual time at which the lead dog was clocked over the finish line and the knowledge of the film speed it becomes a simple matter to rapidly calculate the actual time of any of the other dogs.

If desired, this may be even further simplified by laying arbitrary scale 345 along the photographic record 339, said scale being divided into units which show at a glance the "lengths behind the winner" of any dog in the race. Thus, as shown in Figure 30 it is possible to tell at a glance by comparing strip 339 and scale 345 that the second dog "No. 1" finished almost one length behind the winning dog "No. 6." Similarly, it is apparent at a glance that the last dog "No. 3" finished approximately 8½ lengths behind the lead dog.

If desired, scale 345 may be made up in the form of a permanent negative film and the negative film of each actual race may be printed simultaneously therewith on a positive film to give a permanent record in the form of a positive film containing both the actual race record 339 and the corresponding time chart 345 by film printing methods per se well known in the motion picture art.

*Operation*

In general, it is believed that the operation of the apparatus according to my present invention will have been made clear by the foregoing description. By way of summary and review, however, it may be noted that when the camera has been set up in the desired position at the race track and trained upon the field to be photographed (as shown by telescope 25 attached to the camera), the proper bellows adjustment, the proper diaphragm opening, and the proper exposure slit or aperture adjustment may be made by judgment, or as the result of making one or more test photographs. When it is time for the race, the motor of the camera may be started either at the starting signal or just prior to the time the contestants approach the finish line.

The proper film speed is obtained by adjusting the change-speed mechanism and/or the rheostat 49, the speed of the motor being regulated to cause the film to pass back of the exposure slit or aperture at substantially the same speed as the images of the race contestants. Since the moving film is pressed snugly against the exposure slit or aperture, unusually clear pictures free from fog are thus obtained. The film will pass through the film guide and into the exposed-film receiving compartment and may be cut off at any desired point by operating the film cut-off apparatus, shown in Figs. 26 and 27.

The cut strip of film may then be removed from the receiving compartment (under light-proof conditions, of course) and developed in the usual manner. The developed strip of negative film may be printed simultaneously with a negative of the photo-time-chart 345 of Fig. 30 upon a single positive film to provide a permanent record of the race such as shown in Fig. 30. Alternatively, the cut strip of film may be developed and printed upon a positive film, which latter in turn may then be matched against the previously prepared photo-time-chart 345. If desired, the film employed may be of a kind such as may be subjected to a reversal process of development, as is well known in the art, in order to directly produce a positive photographic record without the necessity of an intermediate printing step.

It will be obvious from the foregoing description that numerous variations may be made by those skilled in the art without departing from the spirit of my invention. Therefore changes, omissions, additions, substitutions and/or modifications may be made within the scope of the following claims without departing from my invention.

I claim:

1. A photographic camera comprising a lens, a member having a narrow elongated exposure aperture therein in optical alignment with the lens, means for selectively attaching thereto either a wide film guide or a narrow film guide for guiding film along said apertured member, perpendicular to said aperture and on the side opposite from the lens to receive light through the lens and the aperture, light-responsive means disposed alongside the exposure aperture at a point opposite the place where the relatively narrow film will pass behind the aperture and in such a position as to receive light directly from the lens, additional light-responsive means disposed alongside said exposure aperture at a point opposite a place where a part of the relatively wide film will pass behind the exposure aperture but where the relatively narrow film will not, and also in a position to receive light directly from the lens, and means for selectively reading the response of the first light-responsive means or the combined response of the first and second light-responsive means.

2. A photographic camera comprising a lens, a member having a narrow elongated exposure aperture therein in optical alignment with the lens, means for selectively attaching thereto a narrow film guide for guiding film along the apertured member, perpendicular to said aperture and on the opposite side thereof from the lens so that it passes behind the aperture at a point near the center thereof and receives light through the lens and exposure aperture, means for selectively attaching a wide film guide for guiding film along the apertured member, perpendicular to said aperture and on the opposite side thereof from the lens so that it also passes behind the exposure aperture at approximately the center thereof but covers a greater portion of the length of the aperture than the narrow film, a plurality of light-responsive means located alongside said exposure aperture near the center thereof, a second series of light-responsive means located alongside said exposure aperture near the ends thereof, means to determine the response of said first series of light-responsive means to determine the intensity of the light falling on a narrow film, and means to determine the combined response of all of said light-responsive means to determine the intensity of light falling on a relatively wider film.

FRED BYRON WILCOX.

REFERENCES CITED

The following references are of record in the file of this patent:

UNITED STATES PATENTS

| Number | Name | Date |
|---|---|---|
| 2,194,031 | Riszdorfer | Mar. 19, 1940 |
| 2,257,100 | Belock | Sept. 30, 1941 |
| 2,307,646 | Sonne | Jan. 5, 1943 |
| 2,192,692 | Nerwin | Mar. 5, 1940 |
| 1,617,080 | Powers | Feb. 8, 1927 |
| 1,756,111 | Wisner | Apr. 29, 1930 |
| 2,220,917 | Schwartz | Nov. 12, 1940 |
| 2,186,613 | Mihalyi | Jan. 9, 1940 |
| 2,210,882 | Carter | Aug. 13, 1940 |
| 1,864,442 | Kinsey | June 21, 1932 |
| 1,885,841 | Krupnik | Nov. 1, 1932 |
| 2,037,453 | Boecking | Apr. 14, 1936 |
| 2,113,580 | Draeger | Apr. 12, 1938 |
| 1,057,412 | Dey | Apr. 1, 1913 |
| 1,898,675 | Lowkrantz | Feb. 21, 1933 |
| 2,238,497 | Merriman | Apr. 15, 1941 |
| 1,308,443 | O'Hara | July 1, 1919 |
| 2,320,350 | Del Riccio | June 1, 1943 |

FOREIGN PATENTS

| Number | Country | Date |
|---|---|---|
| 654,313 | France | Nov. 28, 1928 |
| 499,629 | Britain | Jan. 26, 1939 |
| 520,989 | Germany | Mar. 14, 1931 |